(12) United States Patent
Shingai

(10) Patent No.: US 7,938,390 B2
(45) Date of Patent: May 10, 2011

(54) DOCUMENT FEEDING DEVICE

(75) Inventor: Hiroyuki Shingai, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 7 days.

(21) Appl. No.: 12/394,067

(22) Filed: Feb. 27, 2009

(65) Prior Publication Data

US 2009/0218749 A1    Sep. 3, 2009

(30) Foreign Application Priority Data

Feb. 29, 2008    (JP) ................. 2008-050036

(51) Int. Cl.
*B65H 85/00*    (2006.01)
(52) U.S. Cl. ........ 271/3.14; 271/207; 271/212; 271/213
(58) Field of Classification Search .................. 271/207, 271/212, 213, 65, 291, 301, 186, 3.14
See application file for complete search history.

(56) References Cited

U.S. PATENT DOCUMENTS

| 5,832,356 | A | | 11/1998 | Kurando et al. | |
| 6,027,114 | A | * | 2/2000 | Watanabe et al. | 271/265.01 |
| 6,095,517 | A | * | 8/2000 | Dinatale | 271/212 |
| 7,637,497 | B2 | * | 12/2009 | Kusama | 271/186 |

FOREIGN PATENT DOCUMENTS

| JP | 07-017672 | 1/1995 |
| JP | 8-188321 A | 7/1996 |
| JP | 09-110311 | 4/1997 |

OTHER PUBLICATIONS

Office Action received for Chinese counterpart application No. 20091007927.7 mailed Dec. 6, 2010.

* cited by examiner

*Primary Examiner* — Stefanos Karmis
*Assistant Examiner* — Michael C McCullough
(74) *Attorney, Agent, or Firm* — Banner & Witcoff, Ltd

(57) ABSTRACT

A document feeding device comprises a document input tray, a document output tray placed above the document input tray, and a feeding mechanism provided for a feeding path (connecting the document input tray and the document output tray via a scanning position) to feed each document along the feeding path. The document output tray includes a reference tray and a pivoting tray (on the downstream side of the reference tray) pivotable with respect to the reference tray around a pivot shaft on the upstream side of the pivoting tray. The pivoting of the pivoting tray is restricted at a retracted position by a pivot restricting part when the pivoting tray has pivoted from a document stacking position to the retracted position. The pivot shaft is situated above an upstream end of a stacking surface of the pivoting tray when the pivoting tray is placed at the document stacking position.

11 Claims, 9 Drawing Sheets

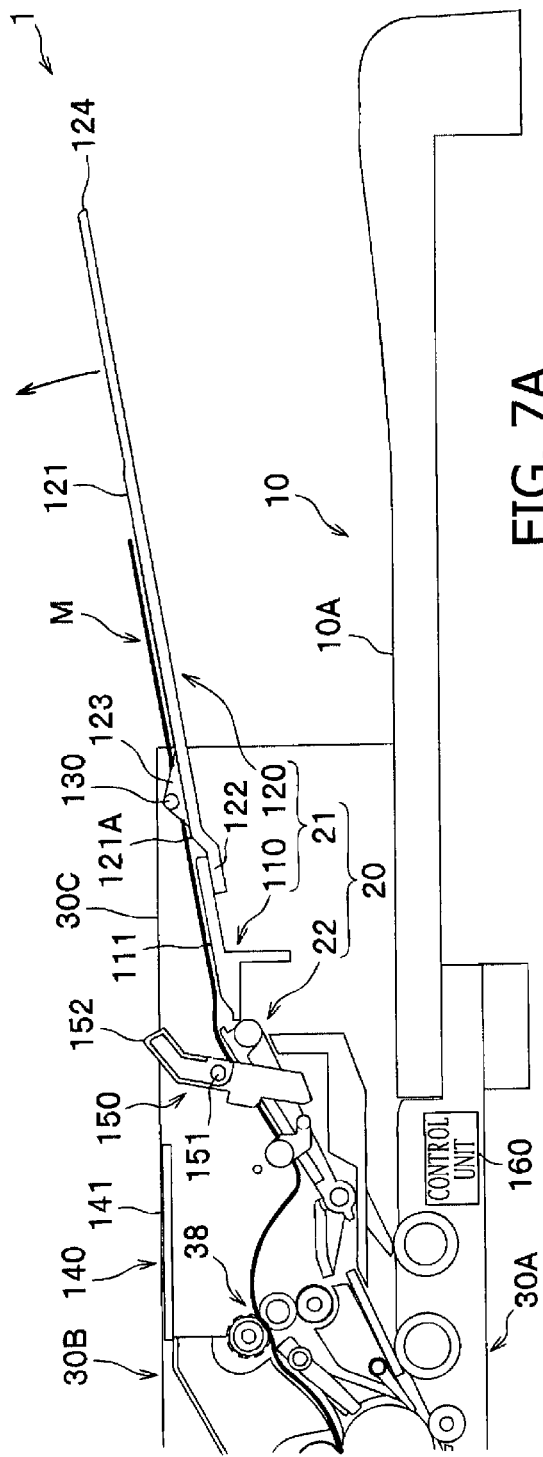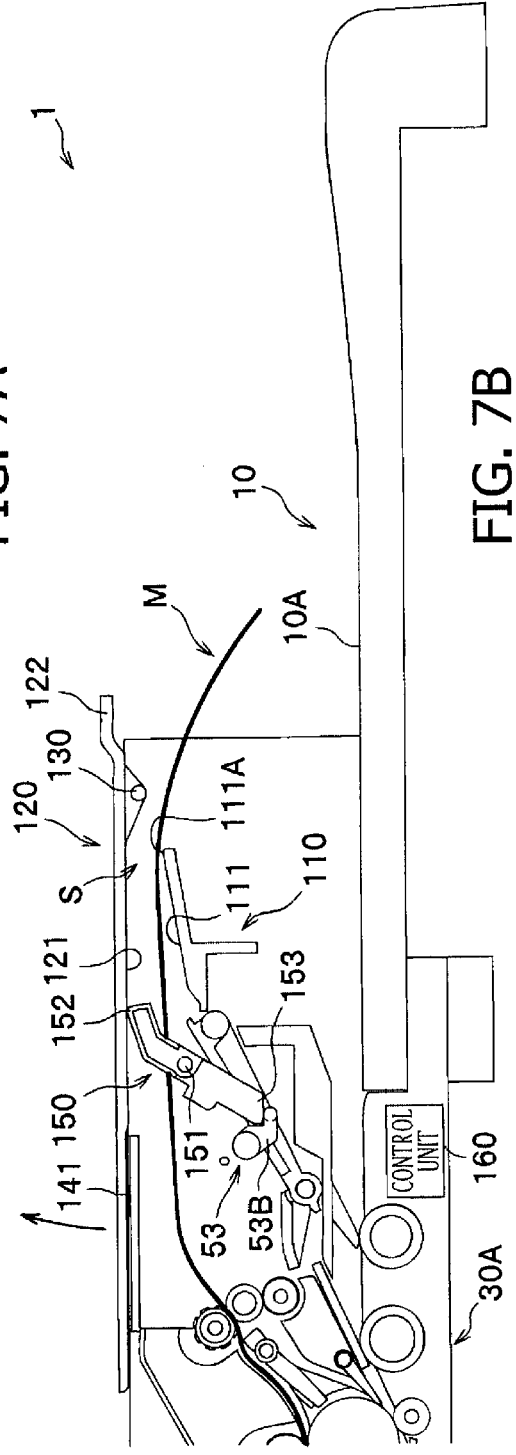

DOCUMENT FEEDING DEVICE

CROSS-REFERENCE TO RELATED APPLICATION

This application claims priority under 35 U.S.C. §119 from Japanese Patent Application No. 2008-050036 filed on Feb. 29, 2008. The entire subject matter of the application is incorporated herein by reference.

BACKGROUND

1. Technical Field

Aspects of the present invention relate to a document feeding device for feeding a document from a document input tray to a document output tray via a scanning position of a document scanner.

2. Prior Art

For document feeding devices in which a document output tray is placed above a document input tray, there exists a known configuration capable of pivoting and retracting the document output tray to an upright position so that the document output tray does not hamper the user from loading documents on the document input tray. In a document feeding device described in Japanese Patent Provisional Publication No. HEI 09-110311 (FIGS. 2-4) (hereinafter referred to as a "patent document #1"), a notch or opening is formed through a part of the document output tray corresponding to a document outlet (through which each document is ejected) so that collision of a document with the document output tray will not occur even if the document is ejected through the document outlet when the document output tray is in the upright position.

SUMMARY OF THE INVENTION

In the configuration described in the patent document #1, however, when the document output tray is used in a normal state (flat position), the front end of a document ejected through the document outlet can hit an edge of the notch or opening and the document can be bent or fed under the document output tray (ejected to the document input tray), by which document ejecting performance of the document feeding device is deteriorated. Especially when the front end of a document being ejected through the document outlet bends downward, the probability of hitting the edge of the notch or opening increases and that is problematic.

In consideration of the above problems, the aspects of the present invention are advantageous in that a document feeding device, capable of preventing the deterioration of the document ejecting performance before and after the pivoting of a pivotable document output tray, can be provided.

In accordance with aspects of the present invention, there is provided a document feeding device for feeding documents, comprising a document input tray on which documents to be fed are placed, a document output tray which is placed above the document input tray and to which the documents are ejected, and a feeding mechanism which is provided for a feeding path connecting the document input tray and the document output tray via a scanning position and feeds each document from the document input tray to the scanning position and from the scanning position to the document output tray. The document output tray includes a reference tray and a pivoting tray which is placed on the downstream side of the reference tray in a feeding direction to be pivotable with respect to the reference tray around a pivot shaft situated on the upstream side of the pivoting tray in the feeding direction.

The document feeding device further comprises a pivot restricting part which restricts the pivoting of the pivoting tray at a retracted position when the pivoting tray has pivoted from a document stacking position, where the documents can be stacked on a stacking surface of the pivoting tray, to the retracted position. The pivot shaft is situated above an upstream end of the stacking surface of the pivoting tray in the feeding direction when the pivoting tray is placed at the document stacking position.

In the document feeding device configured as above, the document output tray includes the reference tray and the pivoting tray, and the pivot shaft of the pivoting tray is situated above an upstream end of the stacking surface of the pivoting tray in the feeding direction when the pivoting tray is placed at the document stacking position. Therefore, a gap can be formed between the reference tray and the pivoting tray when the pivoting tray has been pivoted to the retracted position.

In the case where the pivoting tray has been pivoted to the retracted position, the document ejecting performance is not deteriorated since the ejected document moves on the reference tray and passes through the gap between the reference tray and the pivoting tray. Meanwhile, when the pivoting tray is placed at the document stacking position, even if the front end of the ejected document bends downward, the document first moves on the reference tray while correcting its downward bending and then directly moves (slides) onto the stacking surface of the pivoting tray, by which the document ejecting performance is not deteriorated.

As above, the document feeding device, preventing the deterioration of the document ejecting performance before and after the pivoting of the pivotable document output tray, is capable of ejecting each document smoothly and consistently.

Other objects, features and advantages of the aspects of the present invention will become more apparent from the consideration of the following detailed description taken in conjunction with the accompanying drawings.

BRIEF DESCRIPTION OF THE ACCOMPANYING DRAWINGS

FIG. 7A is a cross-sectional view showing a state of the document feeding device when a pivoting tray is placed at a document stacking position.

FIG. 7B is a cross-sectional view showing a state of the document feeding device when the pivoting tray is placed at a retracted position.

DETAILED DESCRIPTION OF THE EMBODIMENT

Figure 1:
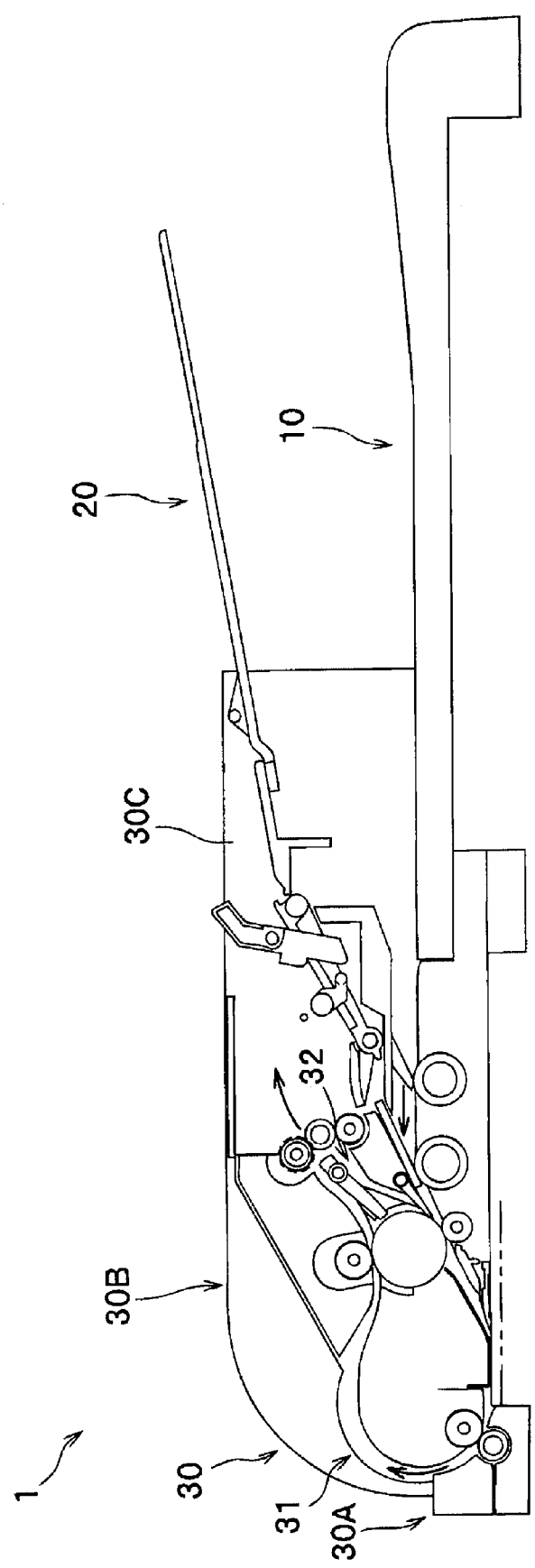
FIG. 1 is a cross-sectional view showing the overall configuration of a document feeding device in accordance with an embodiment of the aspects of the present invention.

Referring now to the drawings, a description will be given in detail of a preferred embodiment in accordance with the present invention.

<Overall Configuration of Document Feeding Device>

Figure 2:
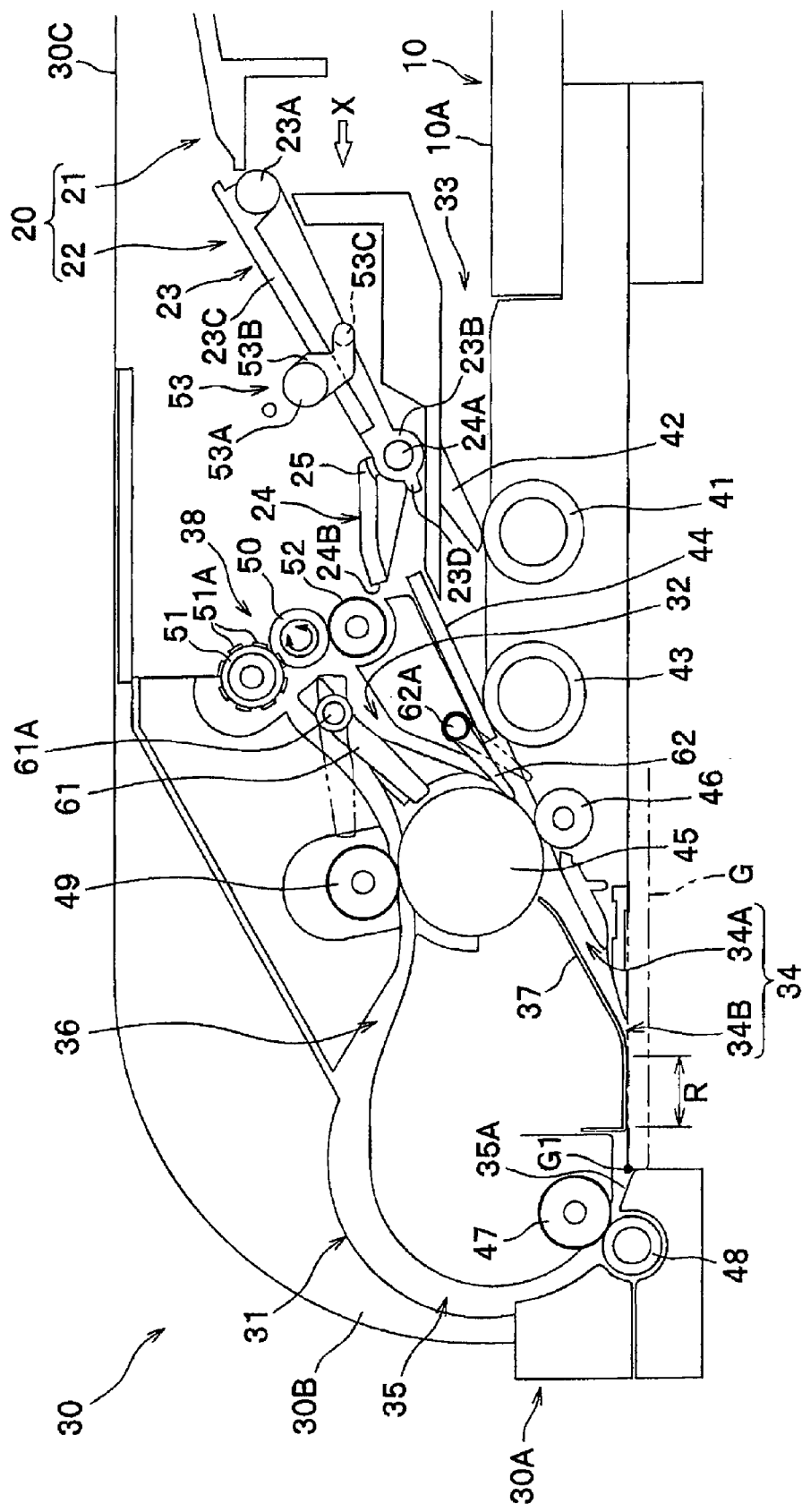
FIG. 2 is a cross-sectional view showing the configuration of a document feeding unit of the document feeding device.

FIG. 1 is a cross-sectional view showing the overall configuration of a document feeding device in accordance with an embodiment of the present invention. FIG. 2 is a cross-sectional view showing the configuration of a document feeding unit of the document feeding device.

As shown in FIG. 1, the document feeding device 1 of this embodiment mainly includes a document input tray 10, a document output tray 20 and a document feeding unit 30.

The document input tray 10, as a part on which documents to be scanned (i.e. documents to be fed) are placed, is situated in a lower right part of the document feeding device 1 in FIG. 1.

The document output tray 20, as a part on which the documents after being scanned (i.e. after being ejected from the document feeding unit 30) are stacked, is situated above the document input tray 10. The detailed configuration of the document output tray 20 will be described later.

The document feeding unit 30, as a unit for feeding the document from the document input tray 10 to the document output tray 20, is situated to the left of the document input tray 10 and the document output tray 20 in FIG. 1. An outer frame of the document feeding unit 30 includes a body frame 30A and a cover 30B which is rotatable with respect to the body frame 30A around an axis in a lower left part in FIG. 1. A feeding path 31 and a turnover path 32 for feeding the document are formed mainly by the body frame 30A and the cover 30B. In the document feeding unit 30, the feeding path 31 is equipped with a feeding mechanism (explained later) and a part of an ejection mechanism (explained later), while the turnover path 32 is equipped with a turnover mechanism (explained later).

In the following explanation, the traveling direction of the document being fed from the document input tray 10 to the document output tray 20 through the feeding path 31 (indicated by arrows in FIG. 1) will be referred to as a "feeding direction". Expressions "upstream side" and "downstream side" in the following explanation mean "upstream side in the feeding direction" and "downstream side in the feeding direction", respectively.

<Configuration of Feeding Path and Turnover Path>

As shown in FIG. 2, the feeding path 31 (formed substantially in a U-shape) is a path connecting the document input tray 10 and the document output tray 20 via a scanning position R. The feeding path 31 is made up of an intake path 33, a lower feeding path 34, a curved path 35 and an upper feeding path 36.

The intake path 33 continuously extends from a loading surface 10A of the document input tray 10 toward the downstream side substantially in a horizontal direction. In the intake path 33, a guide surface is formed by the body frame 30A.

The lower feeding path 34 includes a sloped part 34A extending from the downstream end of the intake path 33 toward the lower left in FIG. 2 and a horizontal part 34B extending downstream substantially in a horizontal direction from the downstream end of the sloped part 34A. In the lower feeding path 34, a lower guide surface of the sloped part 34A is formed by the body frame 30A, while an upper guide surface of the sloped part 34A and the horizontal part 34B is formed by a document guide 37. The bottom of the horizontal part 34B is open (as the scanning position R) so as to expose the document for the scanning.

The document guide 37 mainly includes a sloped part and a horizontal part corresponding to the sloped part 34A and the horizontal part 34B of the lower feeding path 34. The horizontal part of the document guide 37 holds down the document being exposed at the scanning position R. Incidentally, in cases where the document feeding device 1 is used with (installed in) a copier, MFP (Multi-Function Peripheral), etc., platen glass G of a document scanner (unshown) of a well-known type is provided under the horizontal part of the document guide 37. A scan target surface of the document, fed to the scanning position R through the horizontal part 34B while being sandwiched between the document guide 37 and the platen glass G, is scanned by an unshown document scanning unit (e.g. image sensor) placed beneath the platen glass G.

The curved path 35, extending upward like an arc from the downstream end of the lower feeding path 34 (horizontal part 34B), changes the feeding direction by approximately 180 degrees (leftward to rightward in FIG. 2). In the curved path 35, a guide surface is formed by the body frame 30A and the cover 30B. Although not illustrated, a part of the curved path 35 can be exposed by rotating and opening the cover 30B, through which a document jammed in the feeding path 31 can be removed.

Incidentally, a guide surface 35A, sloping from a position under the upper edge of the downstream end of the platen glass G toward a nipping position of a second feeding roller 47 and a pinch roller 48 (explained later), is formed at the bottom of the curved path 35 at its upstream end, by which the document being fed on the platen glass G is smoothly fed to the curved path 35 without getting snagged.

The upper feeding path 36 extends from the downstream end of the curved path 35 toward the document output tray 20. In the upper feeding path 36, an upper guide surface is formed by the body frame 30A, while a lower guide surface is formed by the body frame 30A and a first guide member 61 which will be explained later. The downstream end of the upper feeding path 36 serves as a document outlet 38.

The turnover path 32 extends from the document outlet 38 toward the lower left in FIG. 2 to connect to the upstream end of the lower feeding path 34 (sloped part 34A). In the turnover path 32, guide surfaces are formed by the body frame 30A, the first guide member 61 (explained later) and a second guide member 62 (explained later).

<Configuration of Feeding Mechanism>

The feeding path 31 is equipped with the feeding mechanism, which feeds the document from the document input tray 10 to the scanning position R, and to the document output tray 20. In this embodiment, the feeding mechanism is mainly composed of an intake roller 41, an intake pad 42, a separation roller 43, a separation pad 44, a first feeding roller 45, the second feeding roller 47, a switchback roller 50 and pinch rollers 46, 48, 49 and 51.

The intake roller 41, for pulling the documents placed on the document input tray 10 toward the separation roller 43, is situated to expose its top from the bottom of the intake path 33 at a position near the midpoint of the intake path 33. The intake roller 41 is driven and rotated by driving force transmitted from an unshown motor.

The intake pad 42, for pressing the documents against the intake roller 41 to let the intake roller 41 pull the documents steadily, is situated to face the intake roller 41 from above. The intake pad 42, capable of pivoting up and down, is constantly biased toward the intake roller 41.

The separation roller 43, for sending out the documents one by one, is situated to expose its top from the bottom of the intake path 33 at the downstream end of the intake path 33. The separation roller 43 is driven and rotated by driving force transmitted from the unshown motor.

The separation pad 44, for pressing the documents against the separation roller 43 to let the separation roller 43 separate and send out a document with reliability, is situated to face the separation roller 43 from above. The separation pad 44, capable of pivoting up and down, is constantly biased toward the separation roller 43.

The first feeding roller 45, for feeding the document inside the feeding path 31, is situated to expose its bottom from the top of the lower feeding path 34 (sloped part 34A) at a position near the midpoint of the sloped part 34A while exposing its top from the bottom of the upper feeding path 36 at a position near the midpoint of the upper feeding path 36. The first feeding roller 45 is driven and rotated by driving force transmitted from the unshown motor.

The pinch roller 46 is situated at a position near the midpoint of the sloped part 34A, with its top (exposed from the bottom of the sloped part 34A) contacting the first feeding roller 45.

The second feeding roller 47, for feeding the document from the scanning position R toward the document output tray 20, is situated to expose its bottom from the top of the curved path 35 at a position near the upstream end of the curved path 35. The second feeding roller 47 is driven and rotated by driving force transmitted from the unshown motor.

The pinch roller 48 is situated at a position near the upstream end of the curved path 35, with its top (exposed from the bottom of the curved path 35) contacting the second feeding roller 47.

The pinch roller 49 is situated at a position near the midpoint of the upper feeding path 36, with its bottom (exposed from the top of the upper feeding path 36) contacting the first feeding roller 45.

The switchback roller 50, for ejecting the document to the document output tray 20, is situated at the document outlet 38. The switchback roller 50 is driven and rotated by driving force transmitted from the unshown motor. Incidentally, the switchback roller 50 forms a part of the turnover mechanism (explained later) and the ejection mechanism (explained later).

The pinch roller 51 is situated at the document outlet 38 to contact the switchback roller 50 from above. At both ends of the pinch roller 51 in its axial direction, a plurality of projections 51A, for pushing out the document (to be ejected) by making contact with the rear end of the document in the feeding direction, are formed around the periphery of the pinch roller 51.

Since the pinch rollers 46, 48, 49 and 51 are biased by unshown biasing members toward the corresponding rollers 45, 47, 45 and 50, respectively, the document can be pressed against the rollers 45, 47 and 50, by which the document can be fed with reliability.

<Configuration of Turnover Mechanism>

The turnover path 32 is equipped with the turnover mechanism. The turnover mechanism returns the document from the document outlet 38 to a position on the upstream side of the scanning position R (specifically, to a position on the upstream side of the lower feeding path 34 (sloped part 34A) while interchanging the front end and the rear end of the document in the feeding direction (and turning over the document). In this embodiment, the turnover mechanism is mainly composed of the first guide member 61, the second guide member 62, the switchback roller 50 and a pinch roller 52.

The first guide member 61, which is situated at a position near the document outlet 38 and on the upstream side of the switchback roller 50, is capable of pivoting up and down around a pivot shaft 61A. When the document turnover is not carried out, the first guide member 61 stays downward (as indicated with solid lines in FIG. 2) and thereby guides the document toward a nipping position of the switchback roller 50 and the pinch roller 51. In this state, the first guide member 61 forms a part of the lower guide surface of the upper feeding path 36.

On the other hand, when the document turnover is carried out, the first guide member 61 first pivots upward (as indicated with chain lines in FIG. 2) to change the course of the upper feeding path 36, and thereby guides the document toward a nipping position of the switchback roller 50 and the pinch roller 52. After the whole document has entered the turnover path 32, the first guide member 61 pivots downward (as indicated with solid lines in FIG. 2) to form a part of the guide surface of the turnover path 32.

The second guide member 62, which is situated at the intersection of the turnover path 32 and the feeding path 31 (lower feeding path 34), is capable of pivoting up and down around a pivot shaft 62A. When the document turnover is carried out, the second guide member 62 pivots downward (as indicated with chain lines in FIG. 2) and thereby connects the turnover path 32 to the lower feeding path 34. In this state, the second guide member 62 forms a part of the guide surface of the turnover path 32. When the document turnover is not carried out, the second guide member 62 stays upward (as indicated with solid lines in FIG. 2) to connect the intake path 33 to the lower feeding path 34.

The switchback roller 50 is controlled by a well-known control method so that its rotational direction can be changed. When the document turnover is carried out, the switchback roller 50 is driven and rotated counterclockwise in FIG. 2 so as to temporarily feed the document (sandwiched between the switchback roller 50 and the pinch roller 52) toward the outside. Before the document is totally ejected, the rotation of the switchback roller 50 is stopped according to the well-known control method. Then, the switchback roller 50 is driven and rotated clockwise in FIG. 2 so as to pull in the document sandwiched between the switchback roller 50 and the pinch roller 52. In this state (with the first guide member 61 staying downward as indicated with solid lines in FIG. 2), the document pulled in is guided to the turnover path 32 along the lower surface of the first guide member 61.

The pinch roller 52 is situated in a lower part of the document outlet 38 to contact the switchback roller 50 from below. The pinch roller 52, which is also biased toward the switchback roller 50 similarly to the pinch roller 51 on the other side, is capable of pressing the document against the switchback roller 50, by which the document can be fed steadily.

<Operation of Document Feeding Unit>

Figure 3:
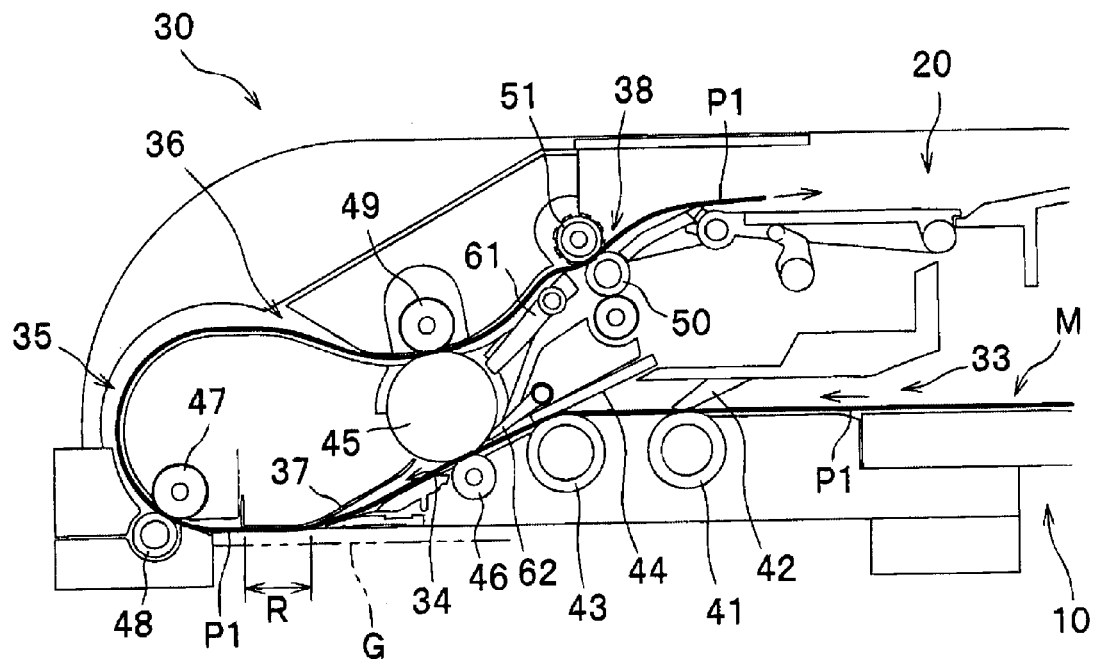
FIG. 3 is a cross-sectional view showing the operation of the document feeding unit for the single-side scan.
Figure 4:
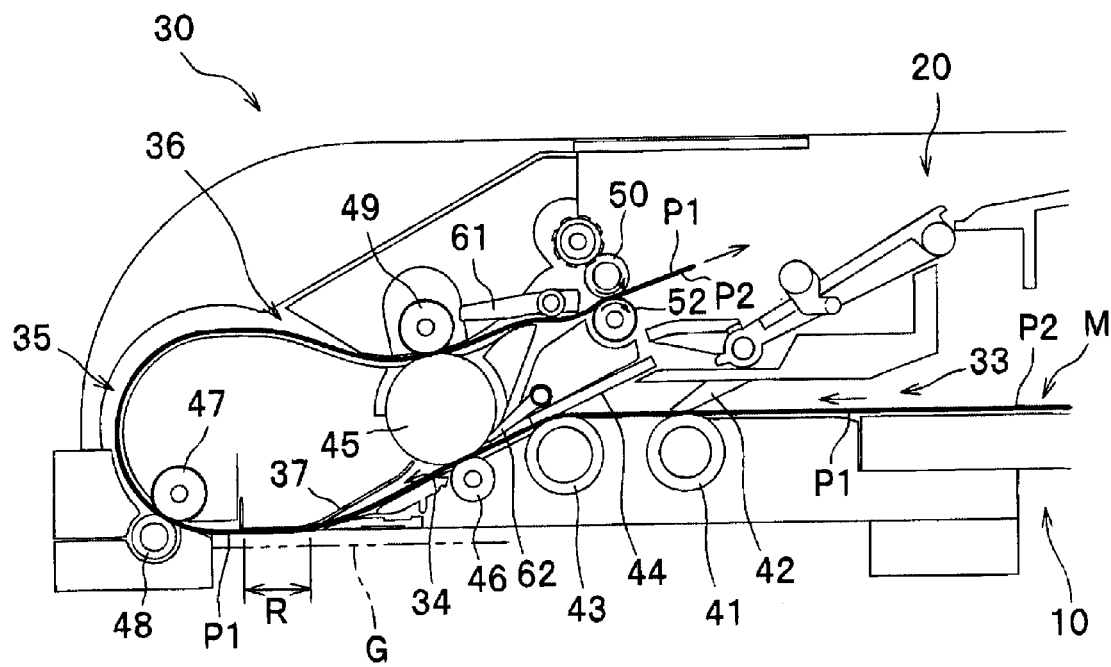
FIG. 4 is a cross-sectional view showing the operation of the document feeding unit for the double-side scan.
Figure 5:
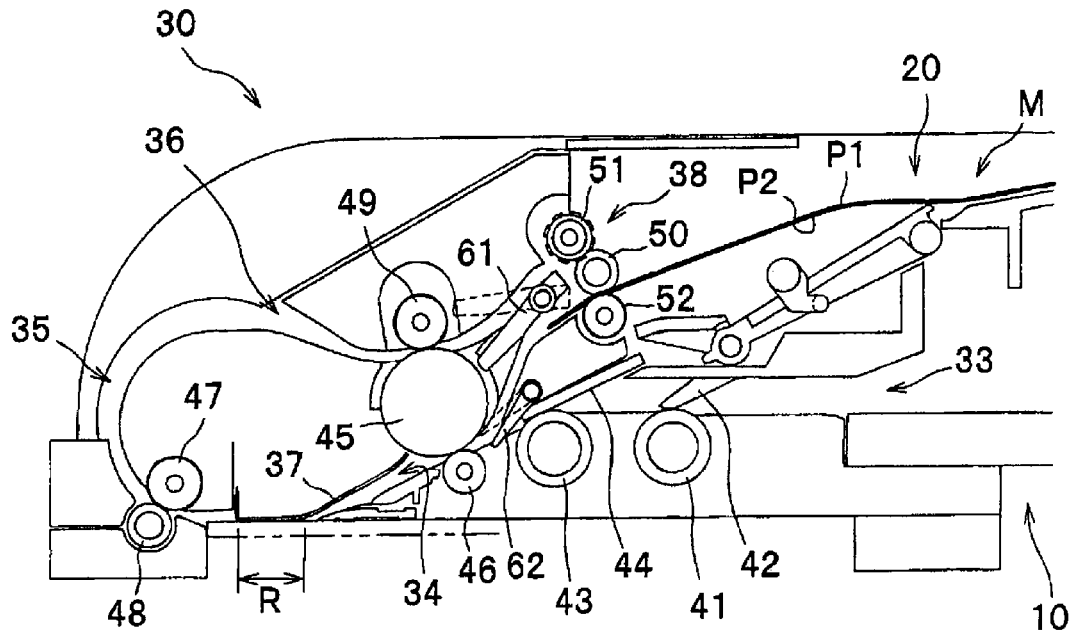
FIG. 5 is a cross-sectional view showing the operation of the document feeding unit for the double-side scan.
Figure 6:
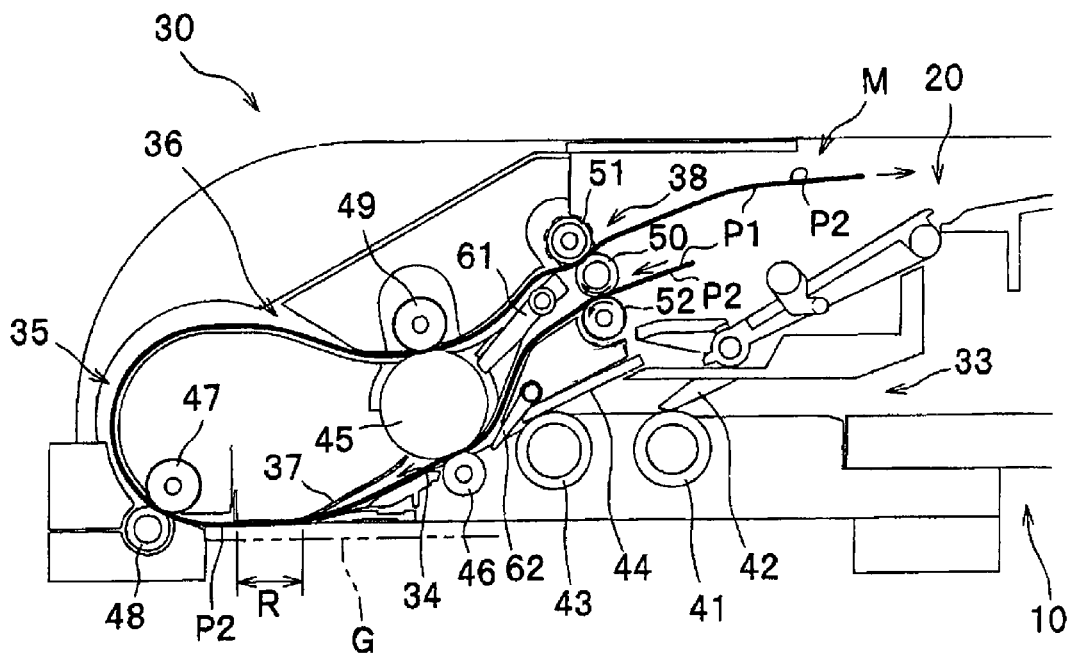
FIG. 6 is a cross-sectional view showing the operation of the document feeding unit for the double-side scan.

Here, the operation of the document feeding unit 30 configured as above will be described. FIG. 3 is a cross-sectional view showing the operation of the document feeding unit 30 for the single-side scan. FIGS. 4-6 are cross-sectional views showing the operation of the document feeding unit 30 for the double-side scan.

The document feeding device 1 is equipped with an unshown operation panel, etc., through which the user can specify the single-side scan or the double-side scan. Incidentally, the operation panel may also be provided on an image scanning device (scanner, MFP, copier, etc.) in which the document feeding device 1 is installed.

(Single-Side Scan)

When the single-side scan is selected by the user through the operation panel, the first guide member 61 stays at the lower position and the second guide member 62 stays at the upper position as shown in FIG. 3. A document M placed on the document input tray 10 with its scan target surface P1 facing downward is pulled toward the separation roller 43 by the intake roller 41 and the intake pad 42 and then fed to the lower feeding path 34 by the separation roller 43 and the separation pad 44.

The document M in the lower feeding path 34 is fed by the first feeding roller 45 and the pinch roller 46 to the scanning position R with its scan target surface P1 facing downward. At the scanning position R, the scan target surface P1 of the document M is scanned by a well-known document scanner. Thereafter, the document M is fed through the curved path 35 and the upper feeding path 36 by the rollers 47, 48, 45 and 49 and then ejected through the document outlet 38 by the switchback roller 50 and the pinch roller 51 with its scan target surface P1 facing upward.

(Double-Side Scan)

When the double-side scan is selected by the user through the operation panel, the first guide member 61 and the second guide member 62 first stay at the upper positions as shown in FIG. 4. A document M placed on the document input tray 10 with its front scan target surface P1 facing downward and its back scan target surface P2 facing upward is fed to the lower feeding path 34 by the rollers 41 and 43 and the pads 42 and 44.

The document M in the lower feeding path 34 is fed by the first feeding roller 45 and the pinch roller 46 to the scanning position R with its front scan target surface P1 facing downward, at which the front scan target surface P1 of the document M is scanned. Thereafter, the document M is fed through the curved path 35 and the upper feeding path 36 by the rollers 47, 48, 45 and 49, guided under the first guide member 61, and fed toward the outside by the switchback roller 50 and the pinch roller 52.

By stopping the switchback roller 50 (by the well-known control method) before the document M is totally ejected by the switchback roller 50 and the pinch roller 52, the document M barely remains inside with its rear end sandwiched between the switchback roller 50 and the pinch roller 52 as shown in FIG. 5. Then, by pivoting both the first guide member 61 and the second guide member 62 downward, the turnover path 32 is formed and connected to the lower feeding path 34. In this state, the front scan target surface P1 and the back scan target surface P2 of the document M are facing upward and downward, respectively.

By reversing the rotational direction of the switchback roller 50 as shown in FIG. 6, the document M is pulled into the turnover path 32 by the switchback roller 50 and the pinch roller 52 and is fed to the upstream part of the lower feeding path 34 (on the upstream side of the scanning position R).

Then, the document M is fed by the first feeding roller 45 and the pinch roller 46 to the scanning position R with its back scan target surface P2 facing downward, at which the back scan target surface P2 of the document M is scanned. Thereafter, the document M is fed through the curved path 35 and the upper feeding path 36 by the rollers 47, 48, 45 and 49 and then ejected through the document outlet 38 by the switchback roller 50 and the pinch roller 51 with its front scan target surface P1 facing downward and its back scan target surface P2 facing upward.

<Configuration of Document Output Tray>

Next, a configuration for pivoting the document output tray 20 (pivoting tray 120) and its action and effect when a document is ejected (features of this embodiment) will be described. FIG. 7A is a cross-sectional view showing a state of the document feeding device 1 when the pivoting tray 120 is placed at a document stacking position. FIG. 7B is a cross-sectional view showing a state of the document feeding device 1 when the pivoting tray 120 is placed at a retracted position.

In the following explanation, the direction orthogonal to the sheet of FIG. 7A (FIG. 7B), that is, the width direction of the document (orthogonal to the feeding direction) will be referred to simply as a "width direction".

As shown in FIG. 7A, the document output tray 20 is mainly composed of a tray part 21 situated over the loading surface 10A of the document input tray 10 and a flap part 22 situated on the upstream side of the tray part 21.

The tray part 21 includes a fixed tray 110 (example of a reference tray) and the pivoting tray 120 which is placed on the downstream side of the fixed tray 110 when the pivoting tray 120 and the fixed tray 110 form a continuous stacking surface as shown in FIG. 7A (document stacking position).

The fixed tray 110 is fixed to side panels 30C on both sides in the width direction. The upper surface of the fixed tray 110 serves as a stacking surface 111 on which the documents ejected are placed and stacked up. Incidentally, the side panels 30C (only one side panel 30C is shown in FIG. 7A), which are placed on both sides of the fixed tray 110 in the width direction integrally with the body frame 30A (see FIG. 1), are panel-like members forming the outer frame (housing) of the document feeding device 1 together with the body frame 30A and the cover 30B.

The pivoting tray 120 is configured to pivot with respect to the fixed tray 110 around a pivot shaft 130 so as to shift between the document stacking position (FIG. 7A) and the retracted position (FIG. 7B). As shown in FIG. 7A, the upper surface of the pivoting tray 120 placed at the document stacking position serves as a stacking surface 121 on which the documents ejected are placed and stacked up. The pivoting tray 120 is equipped with a connection part 122 at its upstream end.

The connection part 122 is formed to extend obliquely downward from the upstream end of the stacking surface 121 and then extend substantially in parallel with the stacking surface 121. The connection part 122 of the pivoting tray 120 placed at the document stacking position makes contact (connection) with the lower surface of the downstream end of the fixed tray 110, by which the pivoting of the pivoting tray 120 is restricted at the document stacking position. In this state, the continuous stacking surface of the tray part 21 is formed by the stacking surface 111 of the fixed tray 110 and the stacking surface 121 of the pivoting tray 120.

The pivot shaft 130, which is formed integrally with the pivoting tray 120, is supported by the side panels 30C to be rotatable. Specifically, an upstream part of the pivoting tray 120 is provided with side plates 123 (only one side plate 123 is shown in FIG. 7A) on both sides in the width direction, which protrude upward from the stacking surface 121 in mountain shapes when viewed from the side. The pivot shaft 130 extends outward in the width direction from outer side faces of the two side plates 123. The pivot shaft 130 is situated above the stacking surface 121 of the pivoting tray 120 placed at the document stacking position (above the upstream end 121A of the stacking surface 121 in this embodiment).

The pivoting tray 120 configured as above can be pivoted from the document stacking position (FIG. 7A) to the retracted position (FIG. 7B) by rotating it (its downstream end 124) relative to the fixed tray 110 around the pivot shaft 130 counterclockwise in FIG. 7A.

Above the flap part 22, a document pressing plate 140 (example of a document pressing member), extending downstream from over the document outlet 38, is formed by the cover 30B as shown in FIG. 7A. The pivoting of the pivoting tray 120 is restricted when its stacking surface 121 makes contact with the upper surface 141 of the document pressing plate 140 as shown in FIG. 7B. Thus, the upper surface 141 of the document pressing plate 140 serves as a pivot restricting part.

After pivoting to the retracted position, the pivoting tray 120 stays substantially horizontal, with its stacking surface 121 facing downward and its connection part 122 situated on the downstream side of the pivot shaft 130 as shown in FIG. 7B. Since the pivot shaft 130 is situated above the upstream end 121A of the stacking surface 121 when the pivoting tray 120 is at the document stacking position, the stacking surface 121 is situated above the pivot shaft 130 after the pivoting tray 120 has pivoted to the retracted position. In this state, a space having a prescribed width (i.e. gap S) is formed between the stacking surface 121 of the pivoting tray 120 and the downstream end 111A of the stacking surface 111 of the fixed tray 110.

Therefore, even when the document M is ejected when the pivoting tray 120 is at the retracted position as shown in FIG. 7B, the document M moves (slides) on the stacking surface 111 of the fixed tray 110 and passes through the gap S, by which the document M can be ejected smoothly. On the other hand, when the document M is ejected in a normal state (with the pivoting tray 120 placed at the document stacking position) as shown in FIG. 7A, even if the downstream end of the ejected document M bends downward, the document M moves (slides) on the upper surface of the flap part 22 and the stacking surface 111 of the fixed tray 110 while correcting its downward bending and then moves (slides) onto the stacking surface 121 of the pivoting tray 120, by which the document M can be ejected smoothly.

As above, the document feeding device 1 of this embodiment is capable of smoothly ejecting the document both before and after the pivoting of the document output tray 20 (pivoting tray 120), that is, irrespective of whether the pivoting tray 120 is at the document stacking position or at the retracted position. Since the connection part 122 is situated on the downstream side of the pivot shaft 130 when the pivoting tray 120 is at the retracted position, the gap S (as a path for the ejected document when the pivoting tray 120 is at the retracted position) can be formed consistently, by which the document ejecting performance of the document feeding device 1 can be maintained at an excellent level.

<Configuration of Ejection Mechanism>

Figure 8:
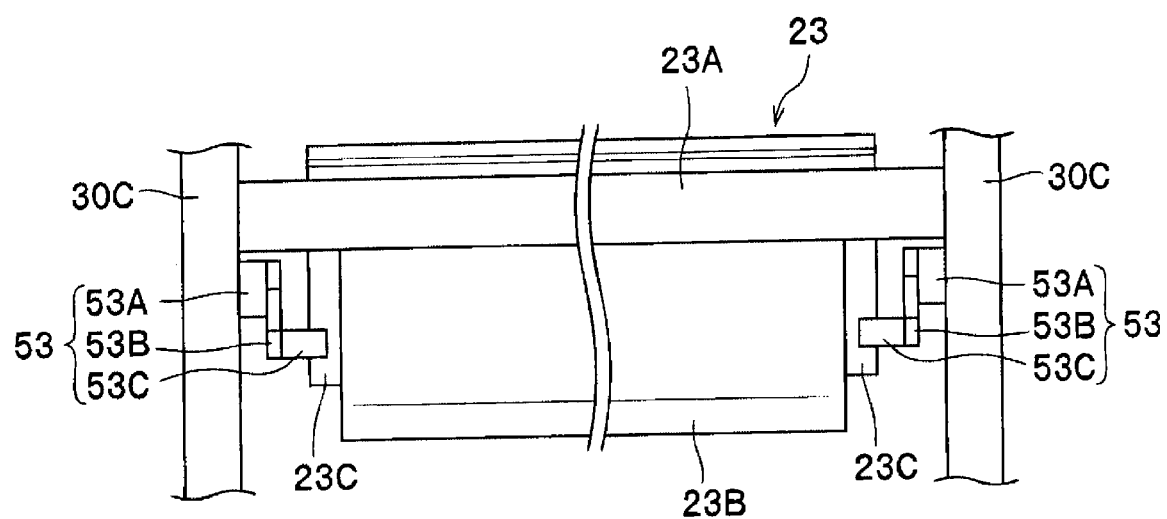
FIG. 8 is a schematic diagram showing a flap part and cams of an ejection mechanism of the document feeding device viewed in the direction of arrow X in FIG. 2.
Figure 9:
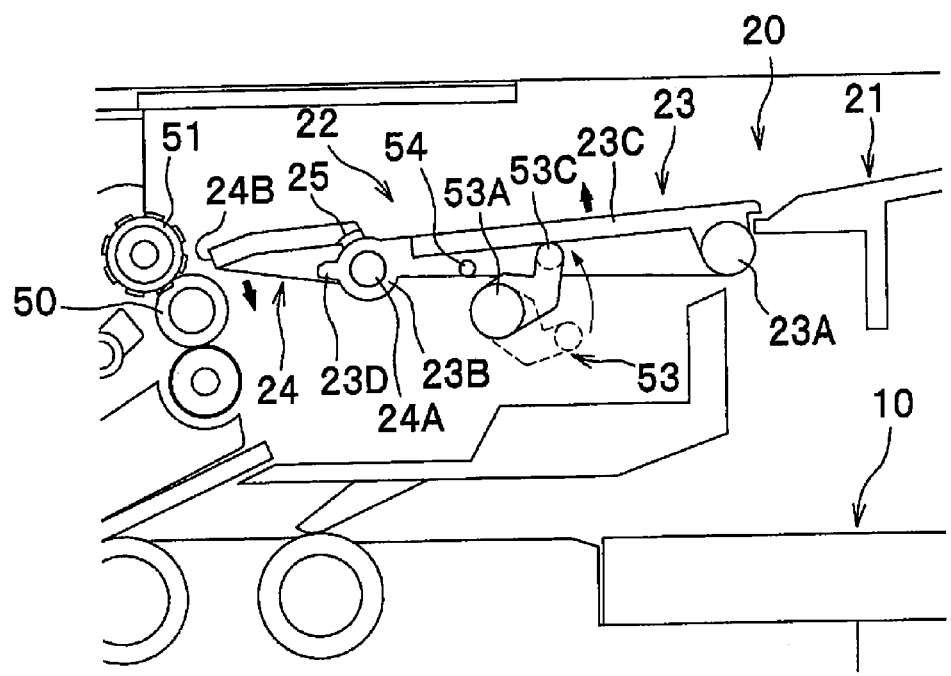
FIG. 9 is a partial cross-sectional view for explaining the operation of the cams and a document output tray of the document feeding device.
Figure 10:
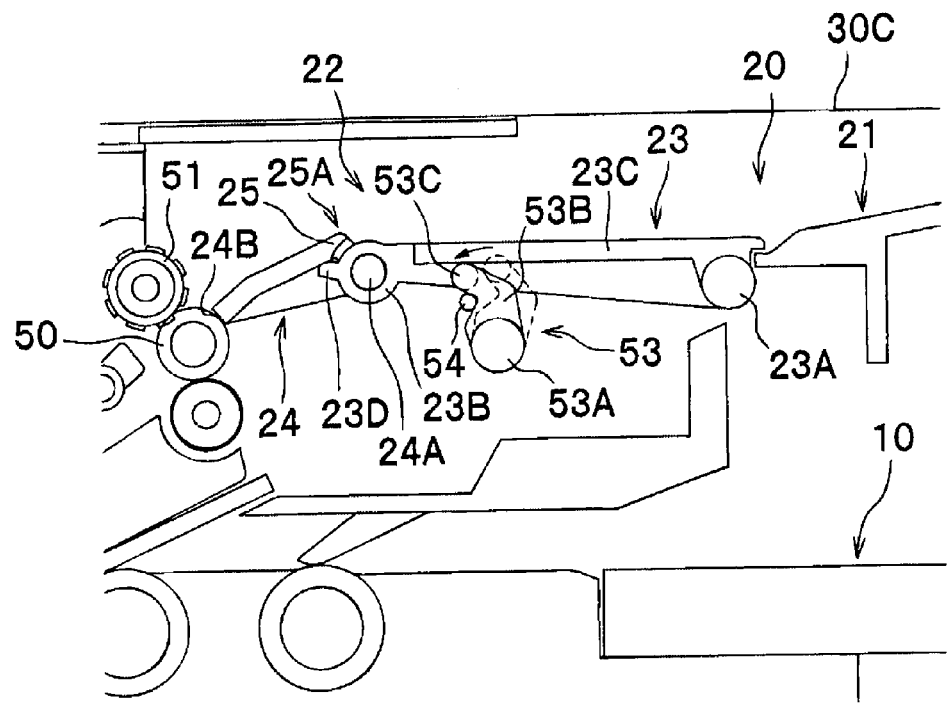
FIG. 10 is a partial cross-sectional view for explaining the operation of the cams and the document output tray.
Figure 11A:
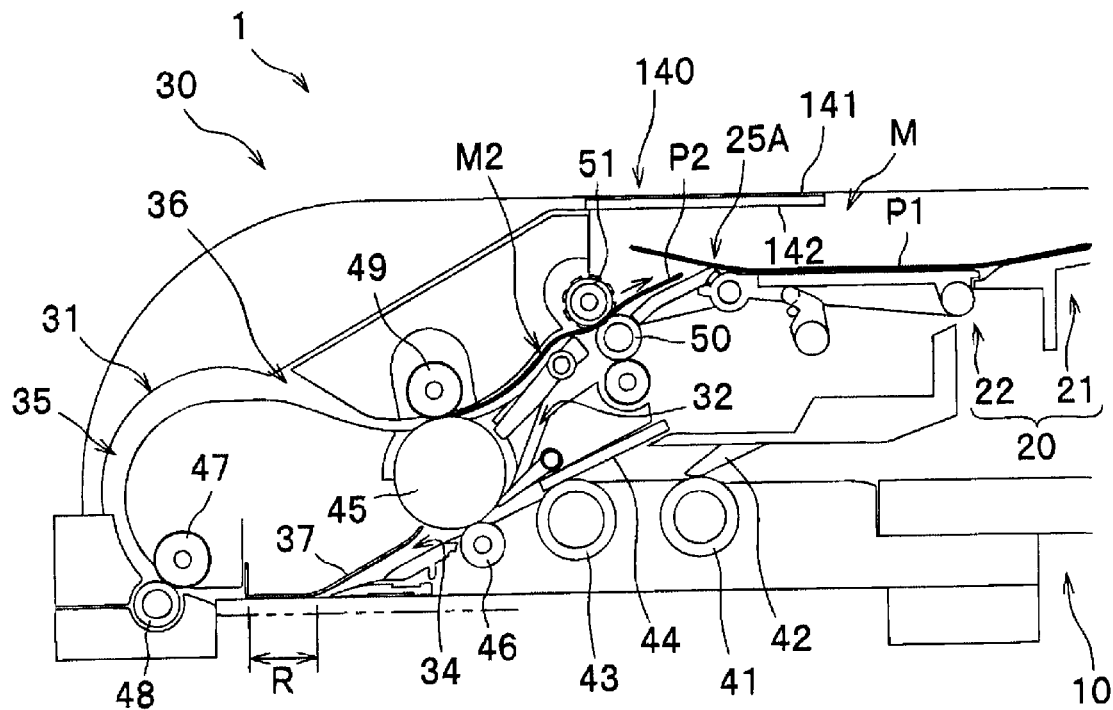
FIG. 11A is a cross-sectional view for explaining the operation of the document feeding device in a second ejection mode.
Figure 11B:
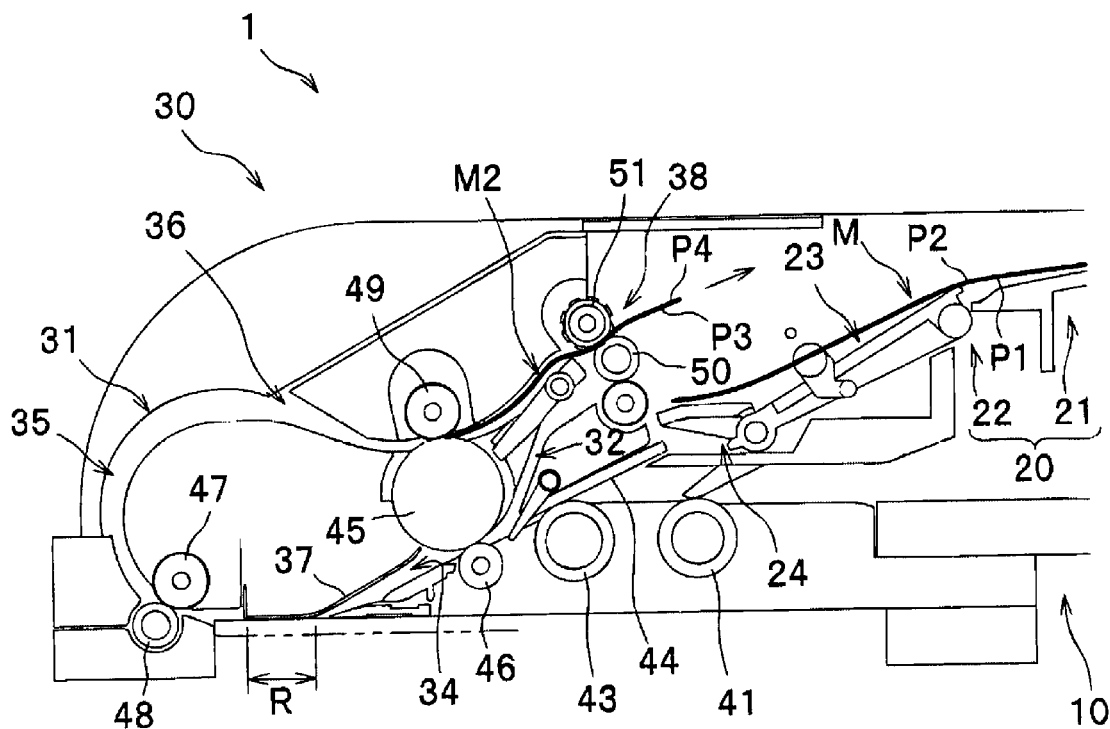
FIG. 11B is a cross-sectional view for explaining the operation of the document feeding device in a first ejection mode.

The document feeding device 1 of this embodiment is further equipped with the aforementioned ejection mechanism whose document ejection mode can be switched. The configuration and control of the ejection mechanism will be described below. FIG. 8 is a schematic diagram showing the flap part and cams of the ejection mechanism viewed in the direction of arrow X in FIG. 2. FIGS. 9 and 10 are partial cross-sectional views for explaining the operation of the cams and the document output tray. FIG. 11A is a cross-sectional view for explaining the operation of the document feeding device 1 in a second ejection mode. FIG. 11B is a cross-sectional view for explaining the operation of the document feeding device 1 in a first ejection mode.

As shown in FIG. 2, the ejection mechanism includes the flap part 22 of the document output tray 20 and cam 53 for pivoting the flap part 22 up and down as main components.

The flap part 22 includes a first flap 23 and a second flap 24.

The first flap 23 is attached to the tray part 21 to be capable of pivoting up and down around a pivot shaft 23A at its downstream end. The first flap 23 has a shaft bearing part 23B at its upstream end. In upper parts of side faces of the first flap 23 on both sides in the width direction, contacting parts 23C (with which the cams 53 (push-up parts 53C) which will be explained later make contact, respectively) are formed to protrude outward in the width direction (see FIG. 8).

The second flap 24 is situated on the upstream side of the first flap 23. The second flap 24 is attached to the first flap 23 to be capable of pivoting around a pivot shaft 24A which is borne by the shaft bearing part 23B of the first flap 23. The second flap 24, having a bent part 25 bending downward on the downstream side, is shaped like an "L" overall. Incidentally, downward pivoting of the second flap 24 is restricted within a prescribed range by a stopper 23D (formed at the downstream end of the first flap 23) which makes contact with the lower surface of the second flap 24.

The cams 53 are provided on both sides of the first flap 23 in the width direction as shown in FIG. 8. Each cam 53 is integrally formed by a shaft part 53A, a link part 53B and a push-up part 53C. The shaft part 53A, which is attached to the side panel 30C to be rotatable, is driven and rotated by driving force transmitted from the unshown motor. The link part 53B, for linking the shaft part 53A with the push-up part 53C, is substantially in parallel with the side panel 30C. The push-up part 53C is a substantially cylindrical part which extends inward in the width direction from the distal end of the link part 53B.

In the ejection mechanism configured as above, the shaft part 53A of each cam 53 is driven and rotated counterclockwise in FIG. 9 by the driving force transmitted from the unshown motor, by which the push-up part 53C of each cam 53 pivots upward around the shaft part 53A. The push-up part 53C makes contact with the lower surface of the contacting part 23C of the first flap 23 and then pushes the contacting part 23C upward, by which the flap part 22 (first flap 23) is pivoted upward around the pivot shaft 23A. The counterclockwise rotation of each cam 53 is restricted when its link part 53B makes contact with each supporting member 54 protruding inward in the width direction from each side panel 30C (only one of the two side panels 30C is shown in FIG. 10) as shown in FIG. 10, by which the cams 53 are stopped.

Meanwhile, in response to the upward pivoting of the first flap 23, the upstream end 24B of the second flap 24 pivots downward around the pivot shaft 24A as shown in FIG. 10 due to its own weight. Due to the downward pivoting of the second flap 24 (upstream end 24B), the apex of the bent part 25 relatively projects upward and thereby forms a projecting part 25A (as the uppermost part of the second flap 24) as shown in FIG. 10. The downward pivoting of the second flap 24 (upstream end 24B) is restricted when the lower surface of the second flap 24 makes contact with the stopper 23D.

In this case where the flap part 22 has pivoted upward, the upstream end of documents M already ejected to the document output tray 20 stays lifted by the projecting part 25A from the document output tray 20 (second flap 24) as shown in FIG. 11A. Thus, when the next document M2 is ejected, the downstream end of the document M2 makes contact with an upstream end part of the lower surface of the documents M. Thereafter, the document M2 is ejected while directly sliding under the documents M.

Incidentally, since the document M2 with its scan target surface P2 facing upward can be ejected under the already ejected documents M whose scan target surfaces P1 are facing upward in the single-side scan explained above (see FIG. 3), the ejected documents M and M2 can be arranged in the normal order. Even when an already ejected document has upward curl at its upstream end, the curl can be restricted by the lower surface 142 of the document pressing plate 140, by which a document ejected next can be consistently slid under the already ejected document. Since the document pressing plate 140 (upper surface 141) serves also as the pivot restricting part as mentioned above, it is unnecessary to provide the pivot restricting part as an extra member, which contributes to simplification of the configuration.

In order to pivot the flap part 22 downward, the shaft part 53A of each cam 53 is driven and rotated clockwise in FIG. 10 by the driving force transmitted from the unshown motor, by which the push-up part 53C (which has supported the contacting part 23C of the first flap 23) pivots downward around the shaft part 53A, by which the flap part 22 (first flap 23) pivots downward around the pivot shaft 23A due to its own weight. Meanwhile, in response to the downward pivoting of the first flap 23, the upstream end 24B of the second flap 24 pivots upward (relative to the first flap 23) around the pivot shaft 24A, by which the apex of the bent part 25 sinks relatively as shown in FIG. 2 (in which the apex is substantially at the same level as the upper surface of the second flap 24 on the upstream side of the apex).

In this case where the flap part 22 has pivoted downward, a document M ejected is placed on the document output tray 20 (the second flap 24, the first flap 23 and the tray part 21) as shown in FIG. 11B. In this state, the upstream end of the document M is situated below the document outlet 38, and thus a document M2 to be ejected next is ejected while being stacked (placed) on the document M.

Incidentally, since the document M2 with its front scan target surface P3 facing downward and its back scan target surface P4 facing upward can be ejected on the already ejected documents M whose front scan target surfaces P1 are facing downward and back scan target surfaces P2 are facing upward in the double-side scan explained above (see FIG. 6), the ejected documents M and M2 can be arranged in the normal order.

As above, the document ejection mode can be switched between the first ejection mode (for ejecting each document M2 while stacking it on the already ejected documents M) and the second ejection mode (for ejecting each document M2 while sliding it under the already ejected documents M) by pivoting the flap part 22 of the document output tray 20 downward or upward with the cams 53.

<Control of Ejection Mode>

Figure 12:
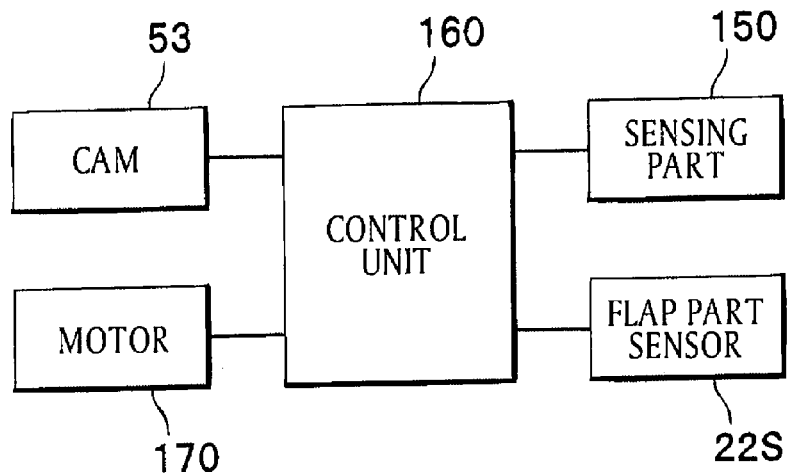
FIG. 12 is a block diagram showing a configuration for controlling the document ejection mode of the ejection mechanism.
Figure 13:
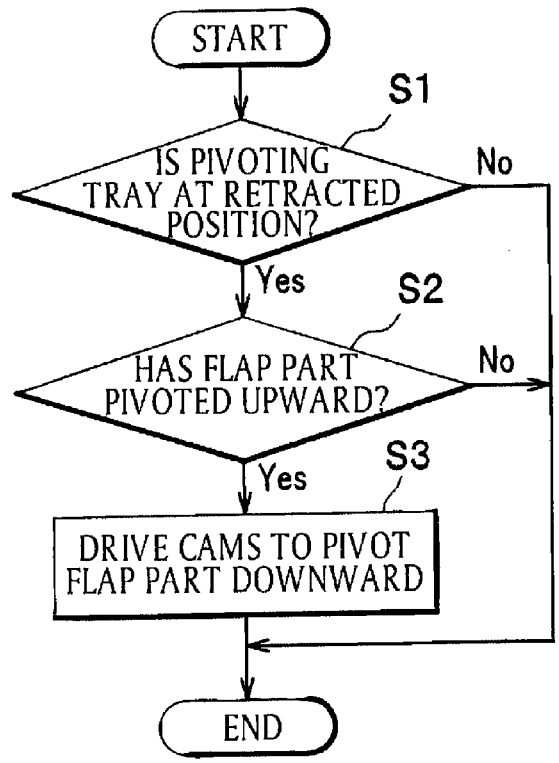
FIG. 13 is a flow chart showing a process flow of the document feeding device between the selection of document scanning by the user and the start of document feeding.

FIG. 12 is a block diagram showing a configuration for controlling the document ejection mode of the ejection mechanism. FIG. 13 is a flow chart showing a process flow of the document feeding device 1 between the selection of document scanning by the user and the start of document feeding.

If a document M is ejected when the pivoting tray 120 is at the retracted position as shown in FIG. 7B, a downstream part of the ejected document M starts bending downward from the gap S (downstream end 111A of the stacking surface 111 of the fixed tray 110). If the second ejection mode is executed in this state, a document ejected next can not smoothly slide under the already ejected document since the frictional resistance between the documents increases at the part bending downward. Such a phenomenon becomes more intense as the number of ejected documents increases.

To deal with this problem, the document feeding device 1 of this embodiment is equipped with a sensing part 150 situated on both sides of the first flap 23 in the width direction (example of a sensing unit), a control unit 160 which is placed at an appropriate position inside the body frame 30A and controls the overall operation of the document feeding device 1, a flap part sensor 22S which detects whether the flap part sensor 22 has been pivoted upward or not, and a motor 170 as shown in FIGS. 7A and 12, so as not to execute the second ejection mode when the pivoting tray 120 is at the retracted position.

The sensing part 150 is a sensor mainly including an actuator (capable of pivoting around a pivot shaft 151 supported by the side panels 30C to be rotatable) and an optical sensor which detects displacement of the actuator. The sensing part 150 is positioned and biased so that its upper ends 152 (on both sides of the first flap 23 in the width direction) are situated above the upper end of the side panel 30C. When the pivoting tray 120 is pivoted to the retracted position as shown in FIG. 7B, the stacking surface 121 of the pivoting tray 120 makes contact with the upper ends 152 of the sensing part 150, by which the sensing part 150 shifts to a pivoted state. In the pivoted state, the sensing part 150 outputs a signal indicating that the pivoting tray 120 is at the retracted position to the control unit 160.

The control unit 160 includes an unshown CPU (Central Processing Unit), RAM (Random Access Memory), ROM (Read Only Memory) and input/output circuit, for example. The control unit 160 controls the rotation of the motor 170, the cams 53, etc. based on programs and data stored in the ROM, the output of the sensing part 150, the output of the flap part sensor 22S, etc.

Specifically, as shown in FIG. 13, the control unit 160 first judges whether the pivoting tray 120 is at the retracted position or not (S1). When the aforementioned signal is inputted from the sensing part 150, the control unit 160 judges that the pivoting tray 120 is at the retracted position (S1: YES). In this case, the control unit 160 judges whether the flap part 22 has pivoted upward or not based on the sensing by the flap part sensor 22S (S2).

When the flap part 22 has not pivoted upward (S2: NO), that is, when the flap part 22 is at its lower position (see FIG. 11B), the prevention of the aforementioned state (in which a document ejected can not be smoothly slid under the already ejected documents) is unnecessary since the current document ejection mode is the first ejection mode (for ejecting each document while stacking it on the already ejected documents), and thus the control unit 160 ends the process of FIG. 13 (returns to an unshown main routine) and starts the document scanning operation. In this case, each document is ejected in the first ejection mode. Incidentally, the flap part sensor 22S for detecting the pivoting of the flap part 22 can be implemented by, for example, a sensor which directly detects the position of the flap part 22, a sensor which detects the position of one of the cams 53, etc.

On the other hand, when the flap part 22 has pivoted upward as shown in FIG. 11A (S2: YES), the control unit 160 rotates (drives) the cams 53 clockwise in FIG. 10 and thereby pivots the flap part 22 downward (S3), by which each document is ejected in the first ejection mode.

When the pivoting tray 120 is not at the retracted position, that is, when the pivoting tray 120 is at the document stacking position (S1: NO), the control unit 160 (not receiving the signal from the sensing part 150) ends the process of FIG. 13 (returns to the unshown main routine) and starts the document scanning operation. In this case, each document is ejected in the first ejection mode or in the second ejection mode depending on the position of the flap part 22.

Incidentally, if the pivoting tray 120 is pivoted to the retracted position when the flap part 22 has pivoted downward, the sensing part 150 is pivoted (shifts to the aforementioned pivoted state) and its lower ends 153 make contact with notches of the link parts 53B of the cam 53, respectively. In this state, the cams 53 are blocked from rotating counterclockwise and pivoting the flap part 22 upward, by which the ejection mechanism is prohibited from executing the second ejection mode.

With the configuration described above, the execution of the second ejection mode can be prohibited when the pivoting tray 120 is at the retracted position (i.e. when each document ejected can not smoothly slide under the already ejected documents), by which the document ejecting performance of the document feeding device 1 can be maintained at an excellent level.

Incidentally, the document M at the scanning position R is fed from the center to the downstream end of the platen glass G (from right to left in FIG. 3) as shown in FIG. 3, etc. in the document feeding device 1 of this embodiment. Thus, the platen glass G (scanning glass) of the document feeding device can be formed by a sheet of glass (transparent material). Suppose that the document M is fed in the opposite direction (from the left end toward the center of the platen glass G) in the configuration of FIG. 3, the document M shoots into a gap between the upper surface of the platen glass G and the lower surface of the document feeding device 1 and the feeding of the document M to the document output tray situated to the upper right (the document input tray 10 in this embodiment) becomes impossible. Thus, in cases where the document M is fed in the opposite direction (opposite to the feeding direction in FIG. 3), the platen glass G has to be separated into two at a position to the right of the scanning position R and a sloped surface (with its lower end situated slightly below the upper surface of the platen glass G and its upper end situated to the upper right) has to be provided between the two sheets of platen glass G so that the document M can be fed to the document output tray situated to the upper right without letting the document M shoot into the gap between the upper surface of the platen glass G and the lower surface of the document feeding device 1. While the platen glass G has to be separated into two in cases where the document M is fed in such a direction (opposite to that in FIG. 3), the document M is fed in the feeding direction shown in FIG. 3 in the document feeding device 1 of this embodiment, by which the platen glass G can be formed by a sheet of glass (transparent material) and the document scanner can be downsized. Consequently, miniaturization of the device (scanner, MFP, copier, etc.) in which the document feeding device 1 is installed can be realized.

While a description has been given above of a preferred embodiment in accordance with the aspects of the present invention, the present invention is not to be restricted by the particular illustrative embodiment and a variety of modifications, design changes, etc. are possible without departing from the scope and spirit of the present invention described in the appended claims.

For example, while the upper surface 141 of the document pressing plate 140 is used as an example of the pivot restricting part in the above embodiment, the pivot restricting part is not to be restricted to the upper surface 141; any configuration capable of restricting the pivoting of the pivoting tray at the retracted position can be used as the pivot restricting part. For example, the pivot restricting part may be implemented by members protruding from the side panels 30C inward in the width direction. Incidentally, by placing the pivot restricting part (e.g. the upper surface 141 of the document pressing plate 140) above the document outlet 38 as in the above embodiment, the loading of the documents on the document input tray 10 is facilitated since the loading surface 10A of the document input tray 10 can be widely exposed by pivoting (rotating) the pivoting tray 120.

While the fixed tray 110 fixed to the side panels 30C is employed as an example of the reference tray in the above embodiment, the reference tray is not to be restricted to such a fixed tray (i.e. a tray that is fixed); the reference tray may also be configured to be pivotable, for example. Specifically, in the above embodiment, a component like the flap part 22 may also be employed as the reference tray without providing the document feeding device 1 with the fixed tray 110.

While the sensing part 150 (serving as a switch of an unshown sensor) is employed as an example of the sensing unit in the above embodiment, the sensing unit is not to be restricted to the sensing part 150. For example, a sensor (switch) provided on the upper surface 141 of the document pressing plate 140 may be employed as the sensing unit.

The configuration of the feeding mechanism described in the above embodiment is just an example, and thus the configuration (e.g. the number, arrangement, etc. of the rollers) can be changed properly as needed. It is also possible to employ a pinch roller instead of each pad. In short, the configuration, employed members, etc. of the feeding mechanism may be changed properly without departing from the scope and spirit of the present invention.

The configuration of the feeding path 31 described in the above embodiment is just an example, and thus the configuration is not to be restricted to that in the above embodiment. In other words, the configuration of the feeding path 31 (or the configuration of the feeding mechanism) may be changed properly depending on the positional relationship between the document input tray and the document output tray, the shape, size, etc. of the document feeding unit, etc.

What is claimed is:

1. A document feeding device for feeding documents, comprising:

a document input tray on which documents to be fed are placed;

a document output tray which is placed above the document input tray and to which the documents are ejected; and a feeding mechanism which feeds each document along a feeding path connecting the document input tray and the document output tray via a scanning position from the document input tray to the scanning position and from the scanning position to the document output tray, wherein:

the document output tray includes a reference tray and a pivoting tray which is placed on a downstream side of the reference tray in a feeding direction to be pivotable with respect to the reference tray around a pivot shaft situated on an upstream side of the pivoting tray in the feeding direction, and the document feeding device further comprises a pivot restricting part which restricts the pivoting of the pivoting tray at a retracted position when the pivoting tray has pivoted from a document stacking position, where the documents can be stacked on a stacking surface of the pivoting tray, to the retracted position, and the pivot shaft is situated above an upstream end of the stacking surface of the pivoting tray in the feeding direction when the pivoting tray is placed at the document stacking position, wherein a space is formed between the stacking surface of the pivoting tray and a stacking surface of the reference tray, when the document output tray is positioned in the retracted position, wherein the space is configured to allow a document ejected by the feeding mechanism to pass through the space to the document input tray.

2. The document feeding device according to claim 1, wherein:

the pivoting tray includes a connection part which is situated at an upstream end of the pivoting tray in the feeding direction and connects with a downstream end of the reference tray when the pivoting tray is placed at the document stacking position, and the connection part is situated on a downstream side of the pivot shaft in the feeding direction when the pivoting tray is placed at the retracted position.

3. The document feeding device according to claim 1, wherein the pivot restricting part is provided above a document outlet through which each document is ejected from the feeding path to the document output tray.

4. The document feeding device according to claim 3, further comprising:

an ejection mechanism which is configured to successively eject each document while sliding each document under documents already ejected to the document output tray; and a document pressing member which extends downstream in the feeding direction from over the document outlet, wherein an upper surface of the document pressing member serves also as the pivot restricting part.

5. The document feeding device according to claim 3, further comprising an ejection mechanism which is configured so that a document ejection mode of the ejection device can be switched between a first ejection mode for successively ejecting each document while stacking each document on documents already ejected to the document output tray and a second ejection mode for successively ejecting each document while sliding each document under the documents already ejected to the document output tray.

6. The document feeding device according to claim 5, wherein the document output tray includes a flap part and the ejection mechanism includes the flap part of the document output tray and a cam for pivoting the flap part, wherein the cam is configured to pivot the flap part upwards to successively eject each document while sliding each document under the documents already ejected to the document output tray.

7. The document feeding device according to claim 6, wherein the flap part includes a first flap and a second flap, situated on the upstream side of the first flap, wherein the cam is configured to pivot the flap part upwards by contacting a lower surface of the first flap and pivoting the first flap upward, such that an upstream end of the second flap is pivoted downward in response to the pivoting of the first flap upward.

8. The document feeding device according to claim 3, further comprising:

an ejection means for successively ejecting each document while sliding each document under documents already ejected to the document output tray; and a document pressing member which extends downstream in the feeding direction from over the document outlet, wherein an upper surface of the document pressing member serves also as the pivot restricting part.

9. The document feeding device according to claim 1, further comprising:

a sensing unit which detects whether the pivoting tray is at the retracted position;

an ejection mechanism which is configured so that a document ejection mode of the ejection mechanism can be switched between a first ejection mode for successively ejecting each document while stacking each document on documents already ejected to the document output tray and a second ejection mode for successively ejecting each document while sliding each document under the documents already ejected to the document output tray; and a control unit which controls the ejection mechanism based on the detection by the sensing unit, wherein the control unit sets the document ejection mode of the ejection mechanism in the first ejection mode when the sensing unit detects that the pivoting tray is at the retracted position.

10. The document feeding device according to claim 1, wherein the pivoting tray is substantially horizontal when positioned in the retracted position.

11. The document feeding device according to claim 10, wherein the stacking surface of the pivoting tray is facing downward when the document output tray is positioned in the retracted position.

\* \* \* \* \*